May 20, 1930.  H. W. PLEISTER ET AL  1,759,591
DROP WIRE SUPPORT
Filed July 25, 1928    2 Sheets-Sheet 1
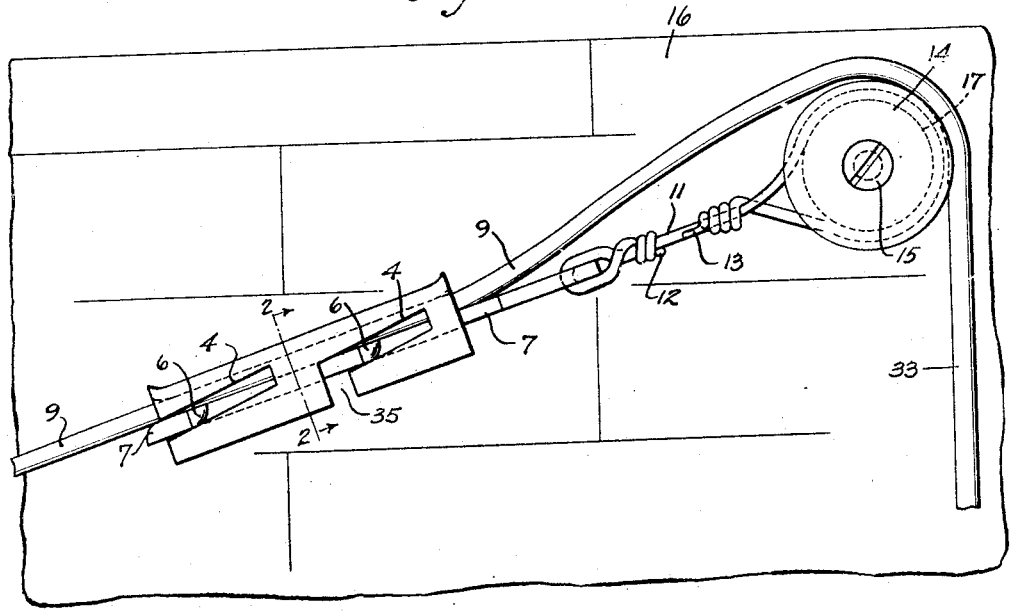
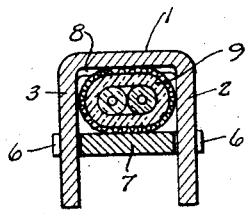
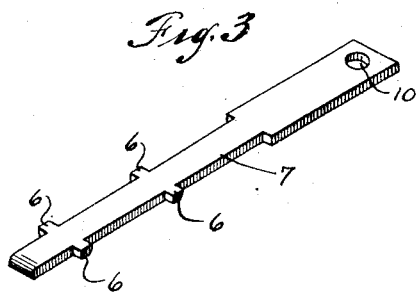
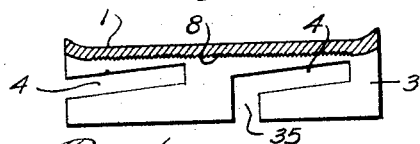
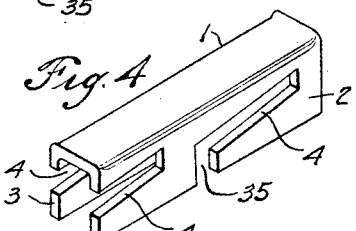
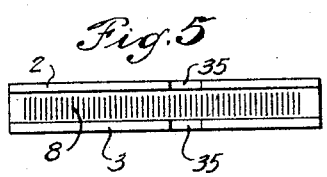
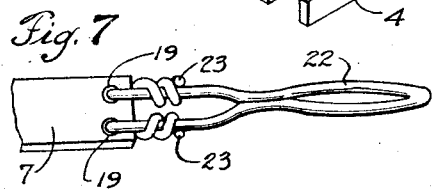

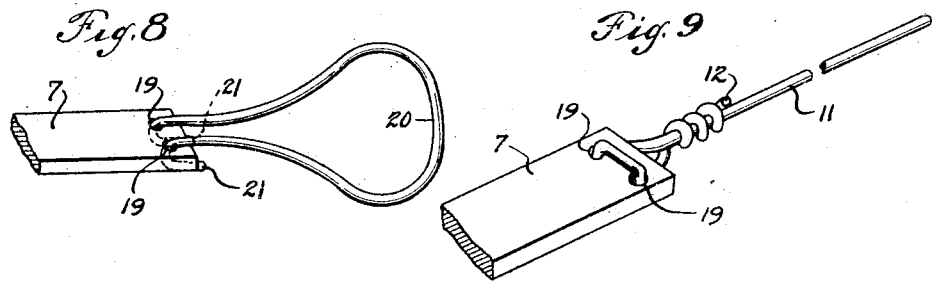
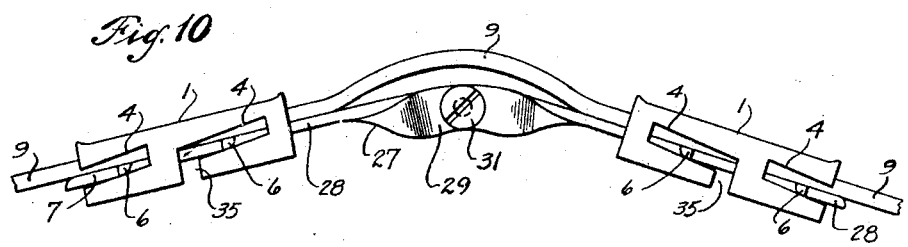
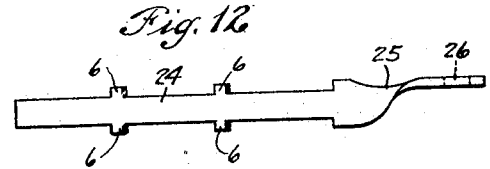
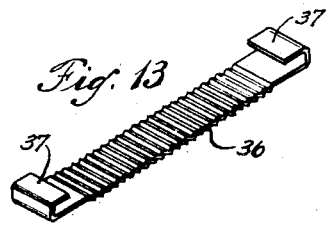
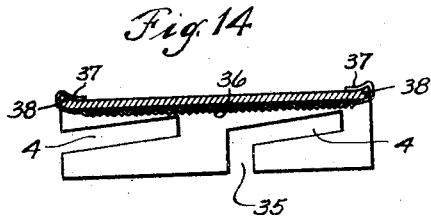
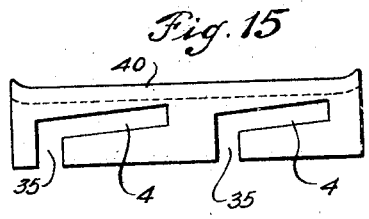

Patented May 20, 1930

1,759,591

UNITED STATES PATENT OFFICE

HENRY W. PLEISTER, OF WESTFIELD, AND JOHN KARITZKY, OF GARWOOD, NEW JERSEY, ASSIGNORS TO HENRY B. NEWHALL CORPORATION, OF GARWOOD, NEW JERSEY, A CORPORATION OF NEW JERSEY

DROP-WIRE SUPPORT

Application filed July 25, 1928. Serial No. 295,149.

This application is a continuation in part of our pending application for "Drop wire support," filed March 2, 1928, Ser. No. 258,646.

Our invention relates to the telephone and telegraph art and more particularly to a drop wire support.

Our invention further relates to articles of manufacture, combinations and sub-combinations and details of construction all of which will be more fully hereinafter described and pointed out in the claims.

In the drawings we have shown different embodiments of our invention, but it is of course to be understood that our invention is not to be confined to these particular embodiments shown by way of illustration.

Fig. 1 is a side elevation of our drop wire support shown supported by an insulating knob mounted on a wall or other suitable support;

Fig. 2 is a vertical cross section on the line 2—2 of Fig. 1;

Fig. 3 is a detail perspective view of the tongue;

Fig. 4 is a detail perspective view of the box in which the tongue is mounted;

Fig. 5 is a detail reverse plan view of one form of our box;

Fig. 6 is a longitudinal vertical section of the box shown in Fig. 5;

Fig. 7 is a fragmentary perspective view showing a modified form of tongue;

Fig. 8 is a detail fragmentary perspective view showing a different manner of attaching a tie member to the tongue;

Fig. 9 is a detail fragmentary view showing another manner of attaching a tie member to the tongue;

Fig. 10 is a side elevation of a modification;

Fig. 11 is a detail plan view of the tongue member shown in Fig. 10;

Fig. 12 is a detail plan view of a modification;

Fig. 13 is a detail perspective view of a separate corrugated member which we may employ;

Fig. 14 is a longitudinal vertical section through the box equipped with the corrugated member; and Fig. 15 is a side elevation of a modified form of box.

In this art it is very important that the insulation of the drop wire should not be marred, broken or ruptured, which would damage the drop wire and lead to short-circuiting. We have, therefore, formed our drop wire support so that the insulation of the drop wire will not be injured while it is supported and clamped in our drop wire support.

We further insure that rain, snow and sleet will not be caught and held in our drop wire support, but on the contrary, the drop wire in our support will be protected from the elements.

In Figs. 1 to 6 inclusive, our drop wire support is formed of a box 1 having sides 2 and 3, the sides 2 and 3 being provided with two or more inclined slots 4—4, and with two or more vertical slots 35, 35. In Figs. 1, 2 and 4 two vertical slots 35 are employed, one in each side 2 and 3. In Fig. 15, four vertical slots 35 are employed, two in each side 2 and 3.

Both the box 1 and the tongue 7 are preferably made from stamped sheet metal, the inclined slots 4—4 being cut out, a portion of the blank being bent to form the sides 2 and 3 of the box. We may provide the interior of the box 1 with a roughened surface 8 to engage with the drop wire 9 as shown more clearly in Figs. 1, 2 and 6. Preferably, however, we employ a separate corrugated member 36, (Fig. 13) of ductile material such as zinc, lead or soft steel and secure it within the box by crimping its heads 37, 37 over the ends of the box 38 as shown in Fig. 14.

In the form of our invention illustrated in Figs. 1 and 3, the tongue is provided with a single hole or aperture 10 to cooperate with a separate flexible tie member 11 which may be a wire formed of copper or other suitable material, one end 12 being threaded through the hole 10 in the tongue and thence wrapped around the tie member so as to secure the tie member to the tongue. The other end 13 of the tie member 11 is passed over the support, preferably an insulating knob 14 secured by a screw or other member 15 in a wall or other suitable support 16. The free end of tie member 11 is passed around the groove 17 in the insulating knob 14 and then its end 13 is wrapped, one or more times, around the tie member as shown in Fig. 13 which will secure the tie member with its tongue 7 to the insulating knob 14.

In use the box 1 is placed over the drop wire 9 and one set of lugs 6, 6 upon the tongue 7 are brought into alinement with the vertical slots 35, 35 and pressed upward. This will bring the other set of lugs 6, 6 to the rear of the box 1 and in line with the two rear inclined slots 4, 4 in the sides 2 and 3. A slight relative movement between the tongue 7 and box 1 will cause both sets of lugs 6, 6 to cooperate with their respective inclined slots 4, 4 and thereby securely clamp the drop wire 9 within the box. The free end of the tie member 11 is then passed around the insulating knob 14 in the manner previously described. The drop wire 9 is then, preferably, passed over the insulating knob 14 and led to its desired terminal. In some cases where, for example, the end 33 of the drop wire is short, it may be threaded through the box 1 while the tongue 7 is located within the box and before any clamping action is exerted by the lugs 6, 6 and inclined slots 4, 4.

It will be clear that with the tongue 7 secured to the fixed insulating knob 14 that pressure or strain upon the drop wire 9 will cause the box 1 to move with the drop wire and cause the inclined surfaces 4—4, in the sides 2 and 3, to ride under the lugs 6—6 on the tongue, and, in this manner, increase the grip of the drop wire support upon the drop wire without, however, marring in any particular the insulation of the drop wire 9.

To remove the drop wire support it is simply necessary to cause a relative movement between the box 1 and the tongue 7 to release the lugs 6—6 from their inclined surfaces 4—4 and bring one set of lugs adjacent to the vertical slots 35, 35 and the other set to the rear of the box, when the tongue can be withdrawn and the box 1 removed from the drop wire 9. This will permit the drop wire to be again used in any other location desired, for its insulation will not be marred. By simply bending back the end 13 of the tie member this member can be released from the insulating knob 14 so that our drop wire support can also be used again in any other location.

Instead of having a tongue 7 provided with a single hole for a flexible tie member, we may provide it with two holes 19—19 (Fig. 7) and thread the end 12 of the tie member 11 through both holes, and then wrap it around the tie member as shown in Fig. 7. Or we may employ a tie member 20 bent back upon itself to form a loop to fit over the insulating knob 14, the two ends 21—21 being bent to form hooks to hook into the holes 19—19 in the tongue 7. We have shown another modification in Fig. 7 in which a tie member 22 is bent to form a loop to fit over a support, such as the insulating knob 14, its two ends 23—23 being threaded through the holes 19—19 and then separately wrapped around each arm of the loop.

In some locations it is not necessary to use any flexible tie member. We have shown a modification of our invention in Fig. 12 in which the tongue 24 has one end 25 bent up at substantially right angles to the remaining portion and provided with a hole 26 for the reception of a nail, screw or other member such as 31 in Fig. 10.

We have shown in Figs. 10 and 11 a double drop wire support 27 having a double tongue 28, (Fig. 11) with different sets of lugs 6, 6 at either end, its intermediate portion being bent at substantially right angles to form a supporting member 29 provided with a hole 30 for the reception of a screw or other securing member 31 (Fig. 10). With the double tongue 28 we employ two boxes 1—1 each cooperating with a different set of lugs 6—6 on tongue 28 so that the drop wire 9 is clamped by both boxes 1—1 in cooperation with the respective sets of lugs 6—6, one set cooperating with each box as shown in Fig. 10.

We have shown a modification of our invention in Fig. 15 in which there are four vertical slots 35, 35, two in each side 2 and 3 of the box 40, each vertical slot connecting with its own inclined slot 4. In this form both sets of lugs 6, 6 will be brought into alinement with the vertical slots and then moved vertically so that they may cooperate with the inclined slots 4, 4 to clamp the drop wire 9 on a relative movement of the box and tongue.

Having thus described this invention in connection with illustrative embodiments thereof, to the details of which we do not desire to be limited, what is claimed as new and what is desired to secure by Letters Patent is set forth in the appended claims.

What we claim is:—

1. The combination in a drop wire support of a box provided with two vertical sides having a plurality of inclined slots, some of which open to the rear of the box, and a tongue adapted to cooperate with the slots.

2. The combination in a drop wire support of a box provided with two vertical sides having a plurality of sets of inclined slots, one set opening to rear of the box, and another set opening intermediate the two ends of the box, and a tongue provided with means adapted to cooperate with the different sets of inclined slots.

3. The combination in a drop wire support of a box provided with two sides and a top, the two sides being provided with inclined slots extending without the box, and a tongue provided with lugs adapted to be threaded into the inclined slots.

4. The combination in a drop wire support of a box provided with two sides and a top, a removable gripping member secured to the top, the two sides being provided with inclined slots extending without the box, and a tongue provided with lugs adapted to be threaded into the inclined slots.

HENRY W. PLEISTER.
JOHN KARITZKY.